US008146165B2

(12) United States Patent
Manickam et al.

(10) Patent No.: US 8,146,165 B2
(45) Date of Patent: Mar. 27, 2012

(54) METHOD AND APPARATUS FOR PROVIDING A DATA MASKING PORTAL

(75) Inventors: S.A. Vetha Manickam, Chennai (IN); S. Saravanan Nattamai, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 876 days.

(21) Appl. No.: 11/839,816

(22) Filed: Aug. 16, 2007

(65) Prior Publication Data
US 2009/0049511 A1 Feb. 19, 2009

(51) Int. Cl.
*G06F 7/04* (2006.01)
(52) U.S. Cl. .............................................. 726/26; 726/1

(58) Field of Classification Search ............ 726/26, 726/1
See application file for complete search history.

(56) References Cited

U.S. PATENT DOCUMENTS
2007/0136237 A1* 6/2007 Barker et al. ..................... 707/2
* cited by examiner

*Primary Examiner* — Jacob Lipman

(57) ABSTRACT

An approach is provided for de-personalizing data. A request is received from an application for retrieval of data. An end user associated with the request is authenticated. A determination is made whether to mask the data based on the request and the authentication. In response to the determination, a masking algorithm is selected to apply to the data and to output mask data.

20 Claims, 11 Drawing Sheets

METHOD AND APPARATUS FOR PROVIDING A DATA MASKING PORTAL

BACKGROUND OF THE INVENTION

Globalization and innovations in communication systems have changed the manner in which society lives, does work, etc. Information technological revolutions, such as the Internet, have created a virtual world without boundaries; such exemplars include virtual offices, virtual businesses, virtual hospitals, and online trading. Moreover, modern information technology (IT) operations and IT enabled services can become virtual in terms of off shoring and near shoring. Data management and protection play a key role in advancing these services. It is recognized that while in transit from one physical location to another, personal, business, or governmental sensitive data need to be protected.

In fact, data protection is necessary to ensure compliance with various privacy laws mandated by numerous countries. For example, in many jurisdictions, sensitive data is not permitted to enter foreign land. Consequently, data that crosses a foreign boundary needs to be de-personalized or sanitized. De-personalization, if performed effectively, can stimulate more offshore work.

Conventionally, cryptography has been utilized to ensure data protection. Even though classical cryptographic techniques address the concerns of privacy when data is in transit, such techniques do not effectively resolve the handling of data after its decryption. In addition, it is difficult to implement total communication security; such approach is not only costly, but key management is tedious. Further, because data can be accessed through any application (which protects user level authorization), the data can be inadvertently disclosed to an unauthorized end user.

Therefore, there is a need for an approach for de-personalizing data as to accommodate a wide range of applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A system, method, and software for masking data are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to data masking, it is contemplated that these embodiments have applicability to any mechanisms that de-personalizes data.

Figure 1:
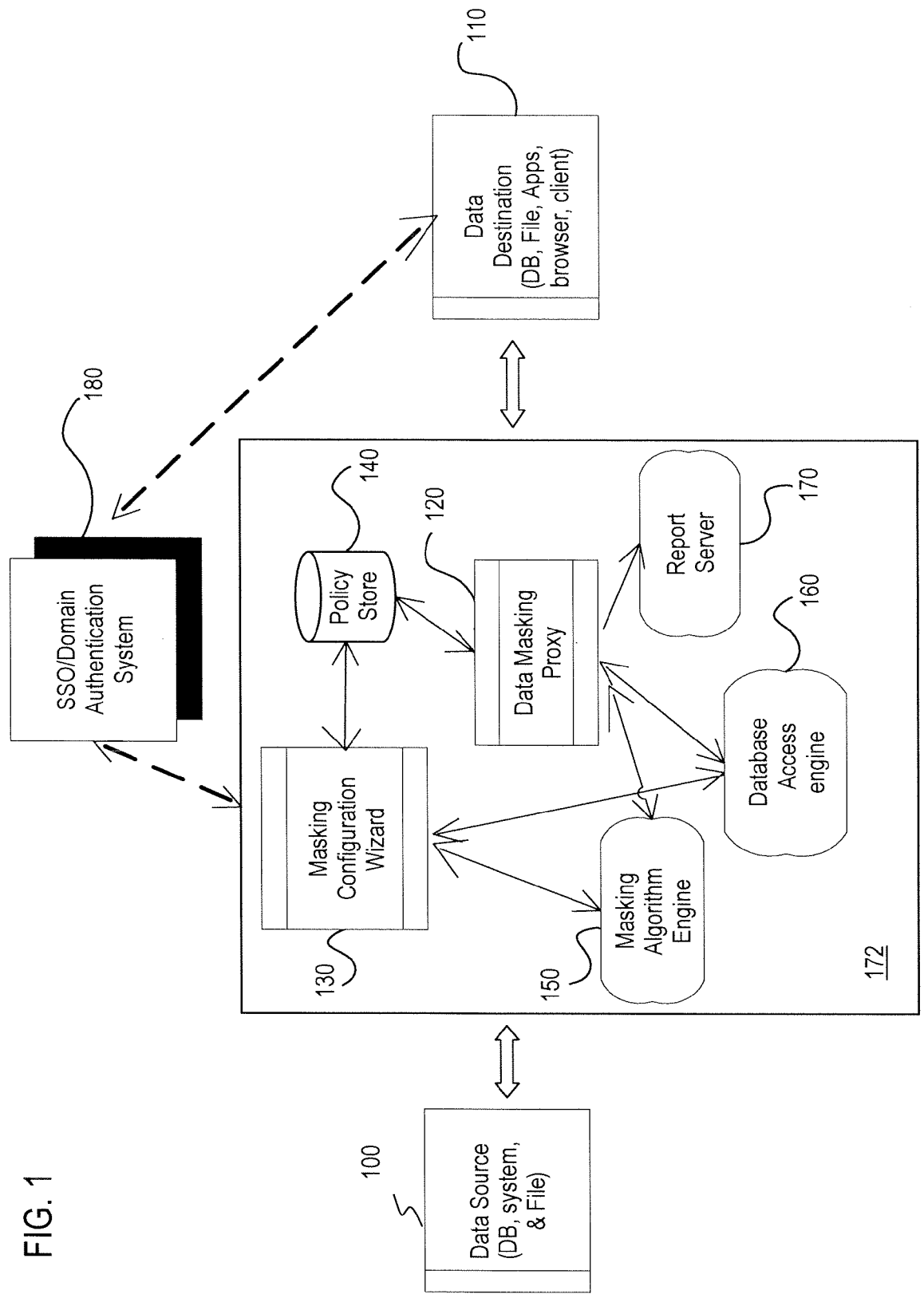
FIG. 1 is a diagram of a system capable of providing data masking, according to an exemplary embodiment.

FIG. 1 is a diagram of a system capable of providing data masking, according to an exemplary embodiment. A data masking architecture is shown in which a data source 100 supplies data to a data destination 110. By way of example, the data source 100 may be a database or file. Also, the data destination 110 can be a database, a file, an application, a browser, a proxy, or a client application. Whenever the data from the data source 100 is accessed by the data destination 110, the data is de-personalized (or sanitized).

According to one embodiment, the data masking architecture includes a data masking proxy 120, a data masking configuration wizard 130, a policy store 140, a masking algorithm engine 150, a database access engine 160, and a report server 170. These components constitute a data masking portal 172 for masking the data while accessing the data source 100. The architecture, according to various embodiments, can accommodate a variety of clients (as shown in FIGS. 6-11): a browser, an application server, a Structure Query Language (SQL) client, a Lightweight Directory Access Protocol (LDAP) client, a mainframe client (e.g., TN3270 client), an editor, etc. The data masking operation, in an exemplary embodiment, can be performed on-the-fly.

Before these clients can access data from the source 100, the end user is authenticated against an enterprise wide authentication system 180, such as Single Sign On (SSO) or Windows Domain system. Based on the authentication and user configuration policy (resident within the policy store 140), the data masking portal 172 determines whether to mask the data.

Policies that are created through the configuration wizard 130 are stored in the policy store 140. In general, the policy store 140 provides secure storage of sensitive data. The data masking proxy 120 retrieves and checks the policy from this policy store 140 for updating of such policies.

Under this architecture, the report server 170 provides for logging of transactions of the portal 172. In an exemplary embodiment, the report server 170 creates and stores logs for debugging and tracing purposes. In this manner, graphical reports and text reports can be generated based on the transactions. This reporting process can be performed on a daily basis to record information about daily transactions.

The portal 172 can provide either static or dynamic masking. To de-personalize the data either in static or dynamic mode, various techniques can be employed (including, for example, known methods). In case of static masking of a relational database (for instance), a large number of rows are processed, whereas dynamic masking handles a single table/view or a join of more than one table/view. In this example, de-personalized data can be available in different environments, including production and non-production scenarios. Masking is one of the processes for de-personalizing the data by protecting sensitive information in non-production databases from unauthorized visibility. Even though a development team may not require live data, the development team may need de-personalized/sanitized data for testing of an application and trouble shooting of particular scenarios or errors in a static mode. Depersonalization (or sanitization) of data poses several challenges in testing and production environments.

Data de-personalization/sanitization extends beyond the technical obstacles. As noted previously, such de-personalization of data is mandated by law. The legal requirements for data sanitization vary from country to country. In the United States for example, the Gramm-Leach-Bliley Act requires institutions to protect the confidentiality and integrity of personal consumer information. The Right to Financial Privacy Act of 1978 creates statutory Fourth Amendment protection for financial records and there are a host of individual state laws. There are also a number of security and privacy requirements for personal information included in the Health Insurance Portability and Accountability Act of 1996 (HIPAA).

With the European Union, Directive 95/46/EC of the European Parliament provides strict guidelines regarding individual rights to data privacy and the responsibilities of data holders to guard against misuse. The United Kingdom Data Protection Act of 1998 extends the European Parliament directive and places further statutory obligations on the holders of personal, private or sensitive data.

Thus, any organization that, for example, outsources test and development operations needs to be conscious of the specific laws regulating the transmission of information across national borders. However large the legal liabilities associated with such violations are, the costs may be trivial in comparison to the losses associated with the catastrophic loss of business confidence that is caused by a large scale privacy breach.

Figure 2:
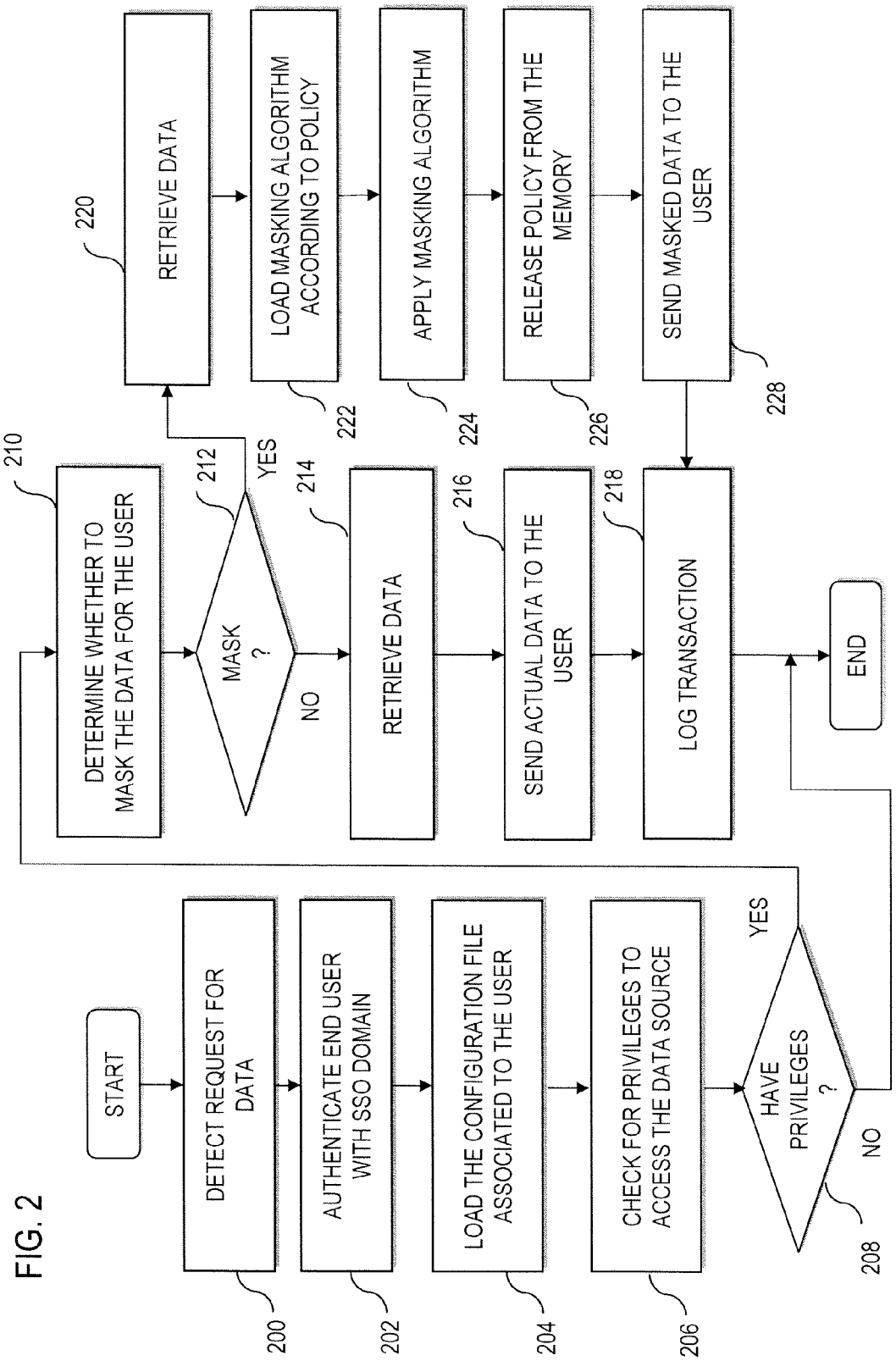
FIG. 2 is a flowchart of a data masking process, according to various exemplary embodiments.

FIG. 2 is a flowchart of a data masking process, according to various exemplary embodiments. By way of example, the data masking portal 172 performs the data masking process, which is described as follows. In step 200, the portal 172 detects a request for data, and authenticates the end user (step 202). Next, the user configuration policy stored in the policy store 140 is retrieved, as in step 204. Based on the user configuration policy and the authentication process, the portal 172 determines, per steps 206 and 208, whether the user has access to this data source. If the determination is in the affirmative, the portal 172 can obtain a masking policy and check whether the user has privilege to view the real data or masked data, per steps 210 and 212. If the determination is in the negative, the portal 172 can retrieve data corresponding to the request, and subsequently sending the actual data to the user, as in steps 214 and 216. Next, the transaction is logged by the report server 170, per step 284.

Returning to step 212 for the determination of whether the masked data is to be viewed, if the determination is negative, the portal 172 can retrieve the data per step 220. In step 222, a masking algorithm is loaded according to the masking policy. The portal 172 then applies the masking algorithm to the retrieved data (step 224). In step 226, the policy is released from memory. This transaction is then logged by the report server 170, per step 218. The masked data is then forwarded to the user, as in step 228.

Data masking client components, such as static masking client, SQL client, LDAP client, Editor, TN3270, web browser, or applications, connect to the data masking proxy 120 for accessing any of the applications or databases of the data source 100. The data masking proxy 120, according to one embodiment, can act as a Windows service, a web service, or hypertext markup language (HTML) proxy.

It is recognized that the data masking requirement for any large organization can be rather extensive. FIGS. 3-5 and 8-10 illustrate some exemplary scenarios involving different data sources and data destinations.

Figure 3:
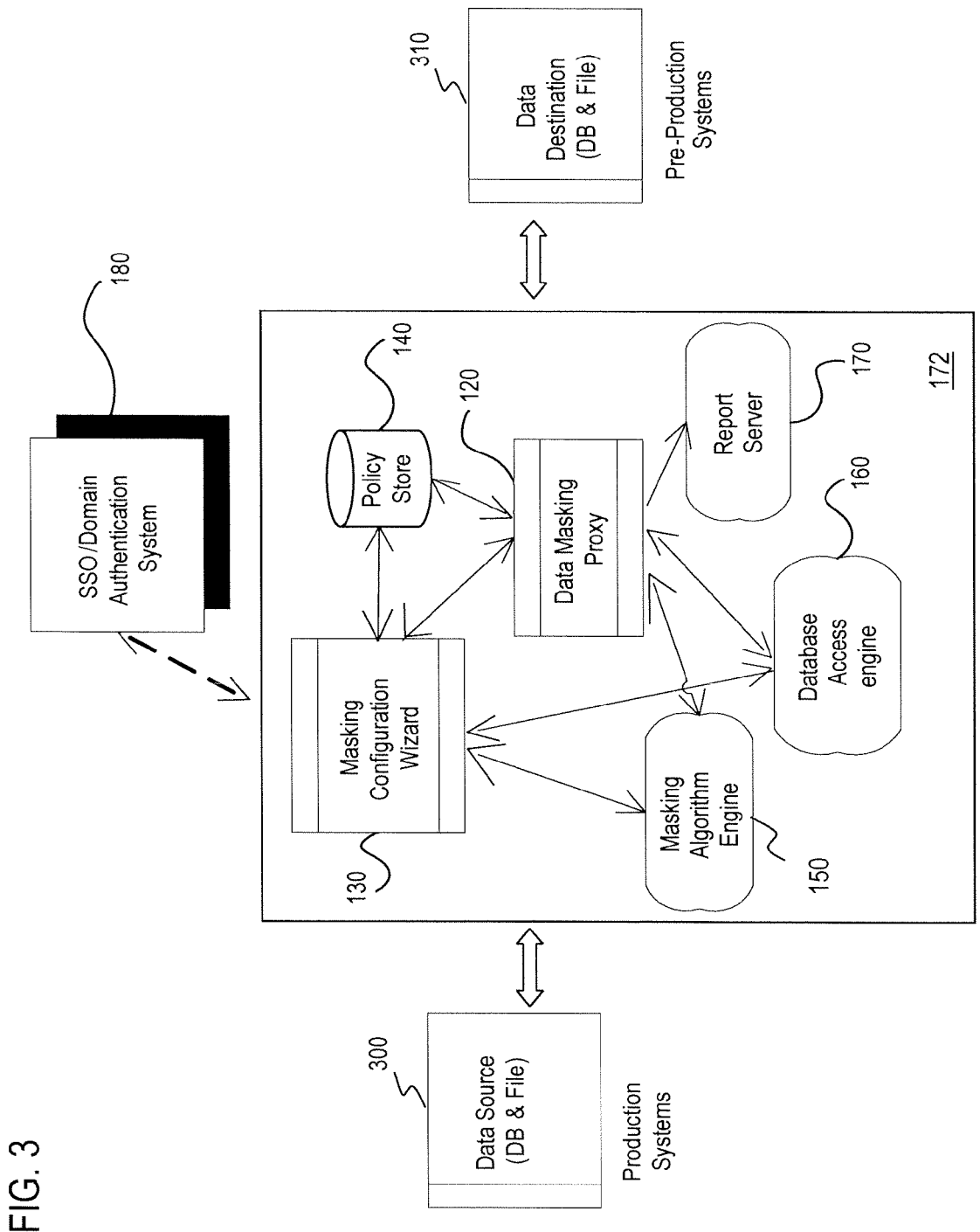
FIG. 3 is a diagram showing the system of FIG. 1 configured to provide static data masking in which the data from production system to non-productions are carried out, according to an exemplary embodiment.

FIG. 3 is a diagram showing the system of FIG. 1 configured to provide static data masking in which the data from production system to non-productions are carried out, according to an exemplary embodiment. In particular, a static masking application is shown, whereby production data needs to be ported during the pre-production environment for various testing and development activities. Whenever an issue arises in the production system for a particular scenario, the data is required in the testing environment to resolve the problem. Conventionally, obtaining access to production data require clearing legal hurdles and can be a manually intensive process. In this example, the data source 300 can be either a database or a flat file.

During the configuration of any database or file, a masking extensible markup language (XML) policy, for example, can be created with the option of masking either onetime or predetermined interval or on demand. Based on the policy and instruction given, the system can transform the masked data to the data destination 310, which can be either a file or a database. Whenever there is a need of masked data, the user can employ the data masking configuration wizard 130 with authorized user logged in using SSO/Domain authentication system 180 to generate the masked data on-demand using the data masking portal 172. According to one embodiment, the user can schedule the masking activity for at periodic intervals to carry out the masking from the data source 300 to data destination 310.

Figure 4:
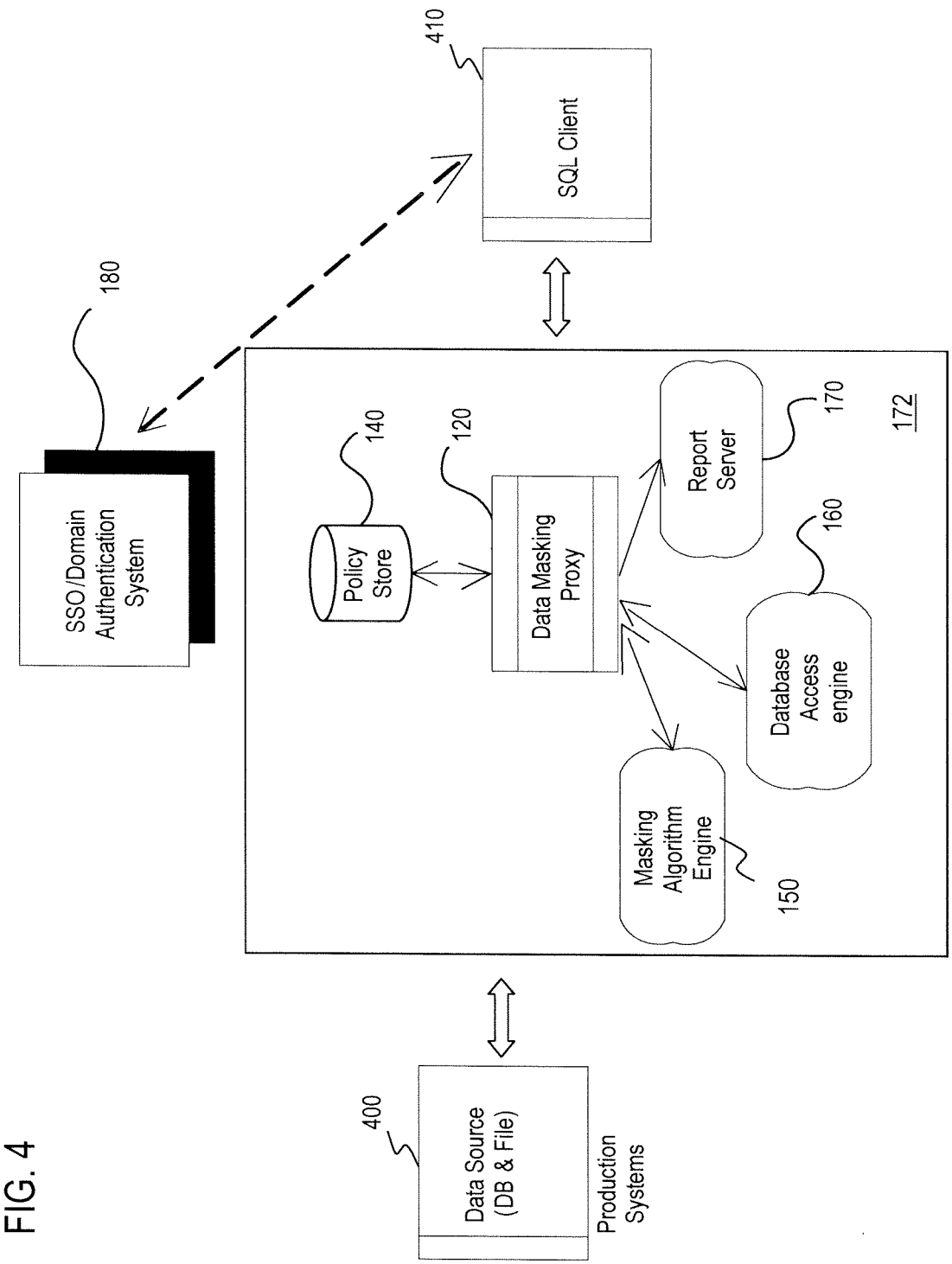
FIG. 4 is a diagram showing the system of FIG. 1 configured to support a Structure Query Language (SQL) masking client capable of accessing a live production system in real-time, according to an exemplary embodiment.

FIG. 4 is a diagram showing the system of FIG. 1 configured to support a Structure Query Language (SQL) masking client that accesses a live production system in real-time, according to an exemplary embodiment. Specifically, this example involves a masking SQL client application accessing data in real-time; such a capability is typical of a database administration function. In other words, the data source 400 communicates with a SQL client 410 to provide data stored as a database or file. Under this scenario, the portal 172 can utilize role based access control mechanism. It is recognized that conventionally even though a role based access control system is utilized, there is no mechanism to prevent a user from viewing the data.

By contrast, the portal 120 of FIG. 4 can prevent data from being viewed online. The SQL masking client 410 can be installed anywhere in the network and can be accessed by any number of users. According to one embodiment, the SQL client 410 always connect to the data masking portal 172 to fetch the data from the data source 400. The data masking proxy 120 interprets the request from the SQL client 410;

based on this interpretation, the proxy 120 obtains any applicable policy from the policy store 140 and fetches the data from the data source 400 (e.g., database or file). Per the policy, the masking of the data is preformed, and the resultant output is provided to the client 410.

In an exemplary embodiment, the SQL client 410 is equipped with the tree-view control to browse through various databases in the network, various tables in the database as well as each field in the table. In addition, the SQL client 410 can include a command line interface so that the end user can execute any SQL query, wherein the output is the masked data. Using this client 410, the proxy 120 can further provide any type of select query, data manipulation queries, and data definition queries; the output from the database is always masked. On invoking this application, the client side authentication takes place with SSO/Domain authentication 180, and the associated policy is invoked. If the user configuration specifies masking, the resultant output is masked; otherwise, the data is rendered as is to the client 410 without masking.

Figure 5:
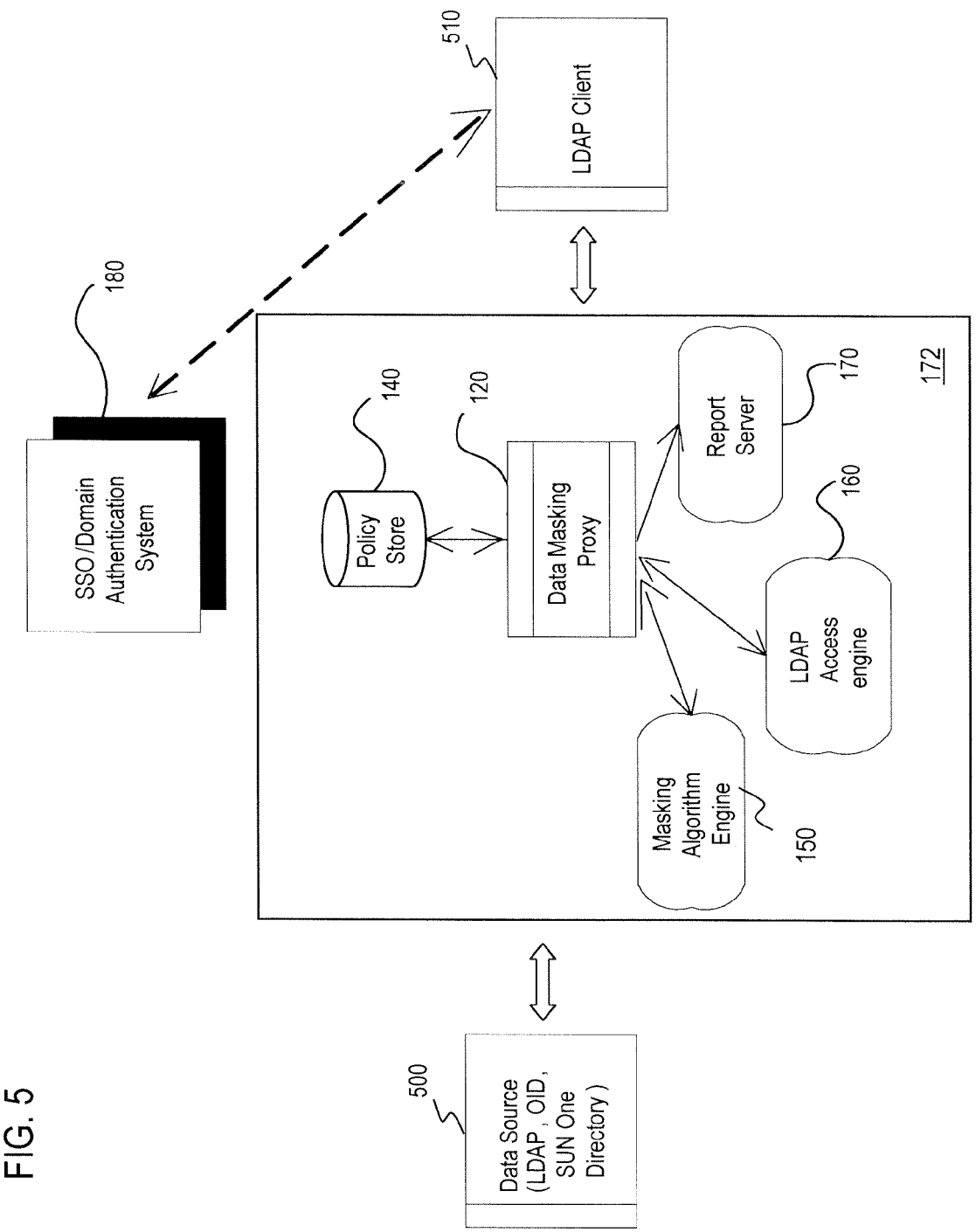
FIG. 5 is a diagram showing the system of FIG. 1 configured to support a Lightweight Directory Access Protocol (LDAP) client capable of accessing a live production system in real-time, according to an exemplary embodiment.

FIG. 5 is a diagram showing the system of FIG. 1 configured to support a Lightweight Directory Access Protocol (LDAP) client capable of accessing a live production system in real-time, according to an exemplary embodiment. In this scenario, the data source 500 is an LDAP server, which stores data accessible by an LDAP client 510. The client 510, in one embodiment, is a real-time LDAP masking client; this capability is needed for a user who assumes an LDAP administrator role. The LDAP masking client 510 can be installed anywhere in the network and utilizes the data masking portal 172 to retrieve data from the LDAP server 500. The data masking proxy 120 interprets requests from the LDAP client 510, and based on the interpretation, the proxy 120 obtains an appropriate policy from the policy store 140 for fetching of the data from the LDAP server 500. The masking of data is performed according to the policy; such masked data is then supplied to the client 510.

In an exemplary embodiment, the LDAP client 510, as with the client 410 of FIG. 4, is equipped with a tree-view control browse through various LDAP elements in the network, as well as the various schemas in the LDAP (as well as each field in the schema). In addition, the client 510 can provide a command line interface for the end user to execute LDAP queries; the responses to such queries are masked. Through the use of the LDAP client 510, masking can be applied to resultant data corresponding to any type of select query, data manipulation queries, and data definition queries.

Figure 6:
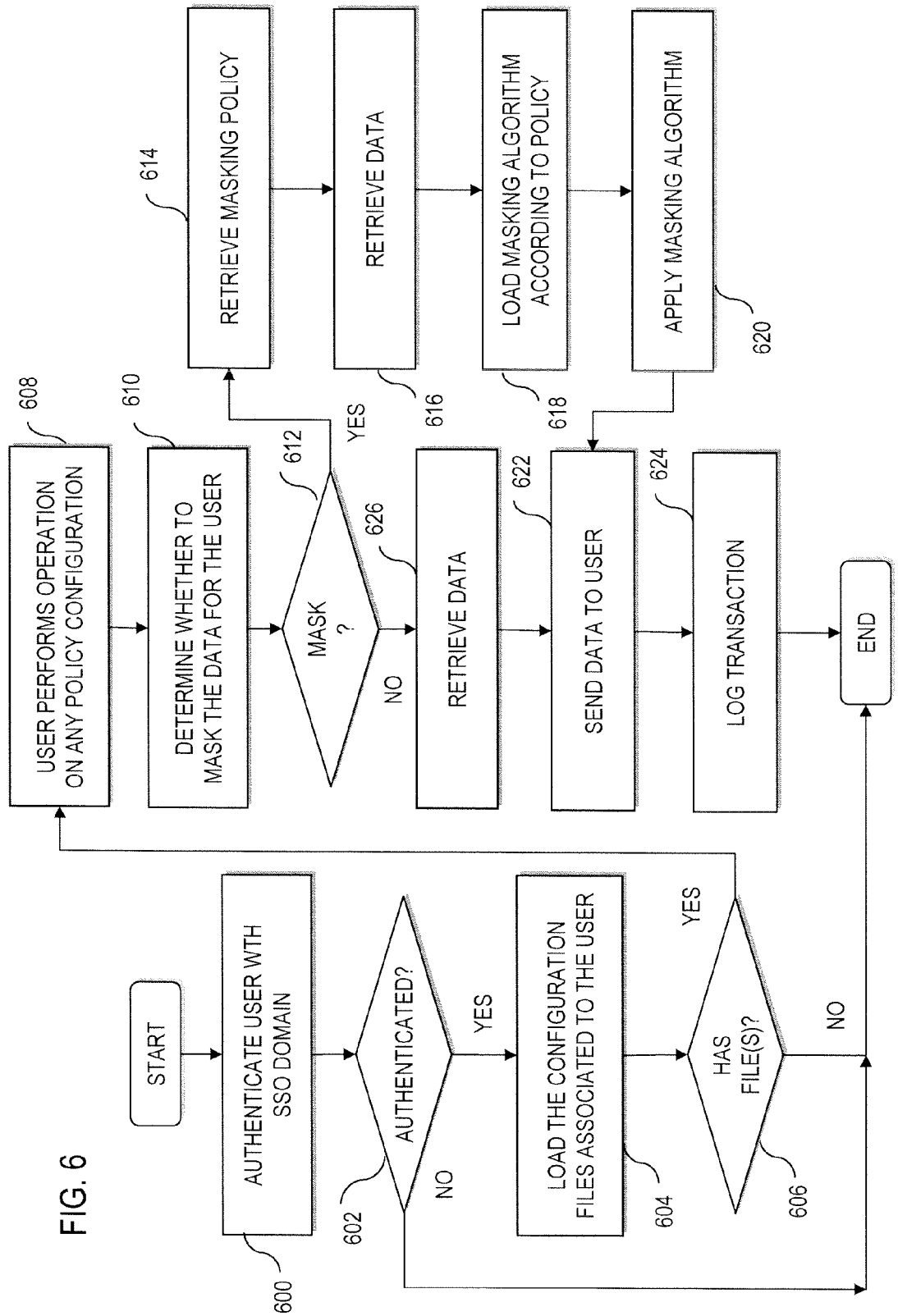
FIG. 6 is a flowchart of a process for performing actions on the systems of FIG. 4 and FIG. 5. using Graphical User interface that applies data masking in the proxy gateway, according to an exemplary embodiment.

The workflow of the SQL/LDAP Mask Client with Graphical User Interface (GUI) in FIG. 6 is explained as follows. In step 600, a user undergoes an authentication procedure with the SSO domain. Next, a determination is made whether the user is authenticated, as in step 602. If the user has been authenticated, the user can load, as in step 604, the configuration(s) from the policy store 140 associated with the user; however, if the user is not authenticated, the workflow ends.

In step 606, the process determines whether the user has an associated file(s)—i.e., configurations. If so, per step 608, the user can select any policy configuration and perform operation on any policy configuration. Thereafter, it is determined whether to mask the data for the user, per step 610. The user is checked for privileges, which specify whether show the real data or masked data.

Upon determining that the data is to be masked, per step 612, the policy configuration is loaded, as in step 614. In step 616, data is then retrieved. Also, the mask algorithm is loaded according to the policy, per step 618. Next, the mask algorithm is applied, as in step 620, and the data is sent back to the user (e.g., client), per step 622. Thereafter, the action is logged, as in the step 624, and the workflow ends.

Back in step 612, if the data is not masked, the data is simply retrieved (step 626). Such data is forwarded to the user, and the transaction is logged, per steps 622 and 624.

Figure 7:
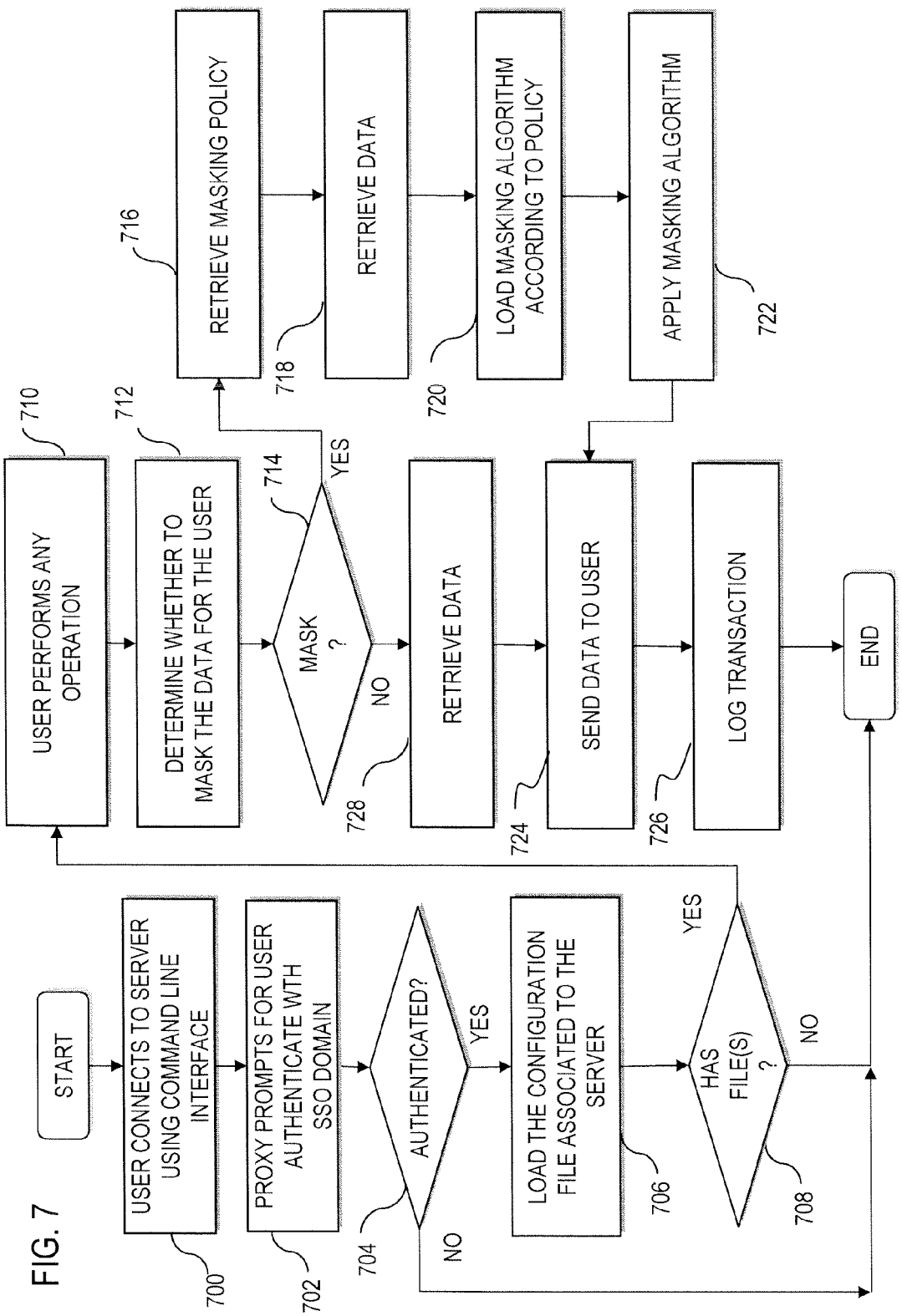
FIG. 7 is a flowchart of a process for performing actions on the systems of FIG. 4 and FIG. 5. using Command Line interface that applies data masking in the proxy gateway, according to an exemplary embodiment.

In another exemplary process, the workflow of a SQL/LDAP Mask Client with Command Line Interface (CLI), as seen in FIG. 7, is explained as follows. In step 700, when the user is trying to connect a data source 100 (e.g., server), the masking proxy 120 can intercept and request for authentication with the SSO domain (step 702). If the user is authenticated, as determined in step 704, the user can load the configuration(s) from the policy store 140 associated with the server 100 (step 706); if not, the workflow ends.

At this point, the remaining steps 708-728 of the process resemble corresponding steps in the process of FIG. 6. Per step 708, if the user is determined to have any file(s) or configuration(s), any policy configuration can be selected, per step 710. In step 712, user is checked for the proper privileges for revealing the real data or masked data.

If the data is to be masked, as determined in step 714, the masking policy is retrieved and such policy configuration is loaded, as in step 716. In step 718, data is retrieved, and the mask algorithm is loaded according to the policy, per step 720. Next, the mask algorithm is applied, per step 722; and the data is transmitted to the user, per step 724. This transaction is then logged (step 726). If the data is not masked, the data is retrieved (step 728), and steps 724 and 726 are performed.

Figure 8:
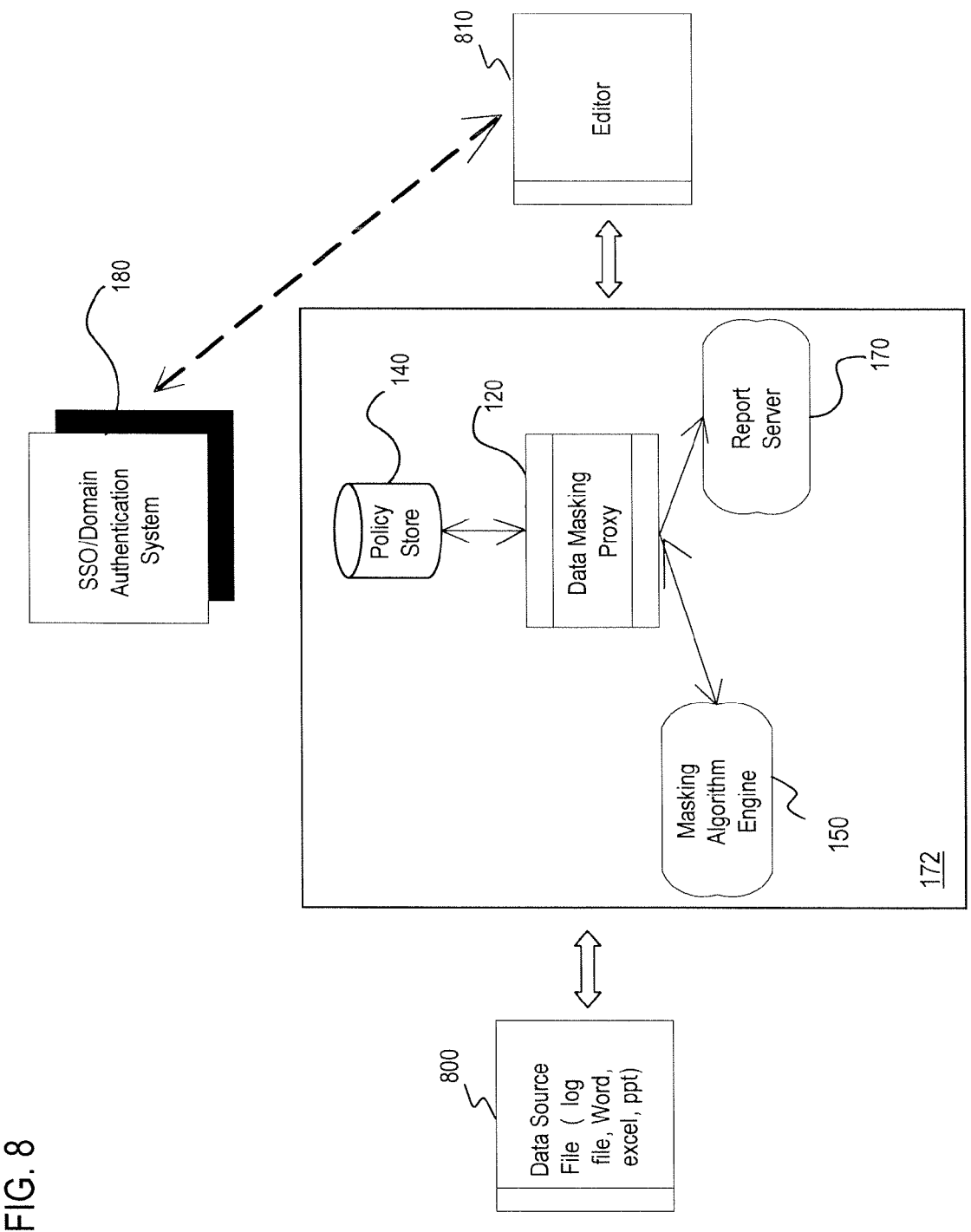
FIG. 8 is a diagram showing the system of FIG. 1 configured to provide a real-time masking editor for securely accessing files, according to an exemplary embodiment.

FIG. 8 is a diagram showing the system of FIG. 1 configured to provide a real-time masking editor for securely accessing files, according to an exemplary embodiment. The data source 800 in this scenario can include a log file, or files associated with office productivity applications such as Microsoft Word, Microsoft Excel and Microsoft PowerPoint. A masking editor 810 processes, in real-time, these files to ensure data privacy. The editor 810 connects to the data masking proxy 120 to fetch the data. As explained previously, the data masking proxy 120 applies data masking based on any applicable policy designated for the application.

Figure 9:
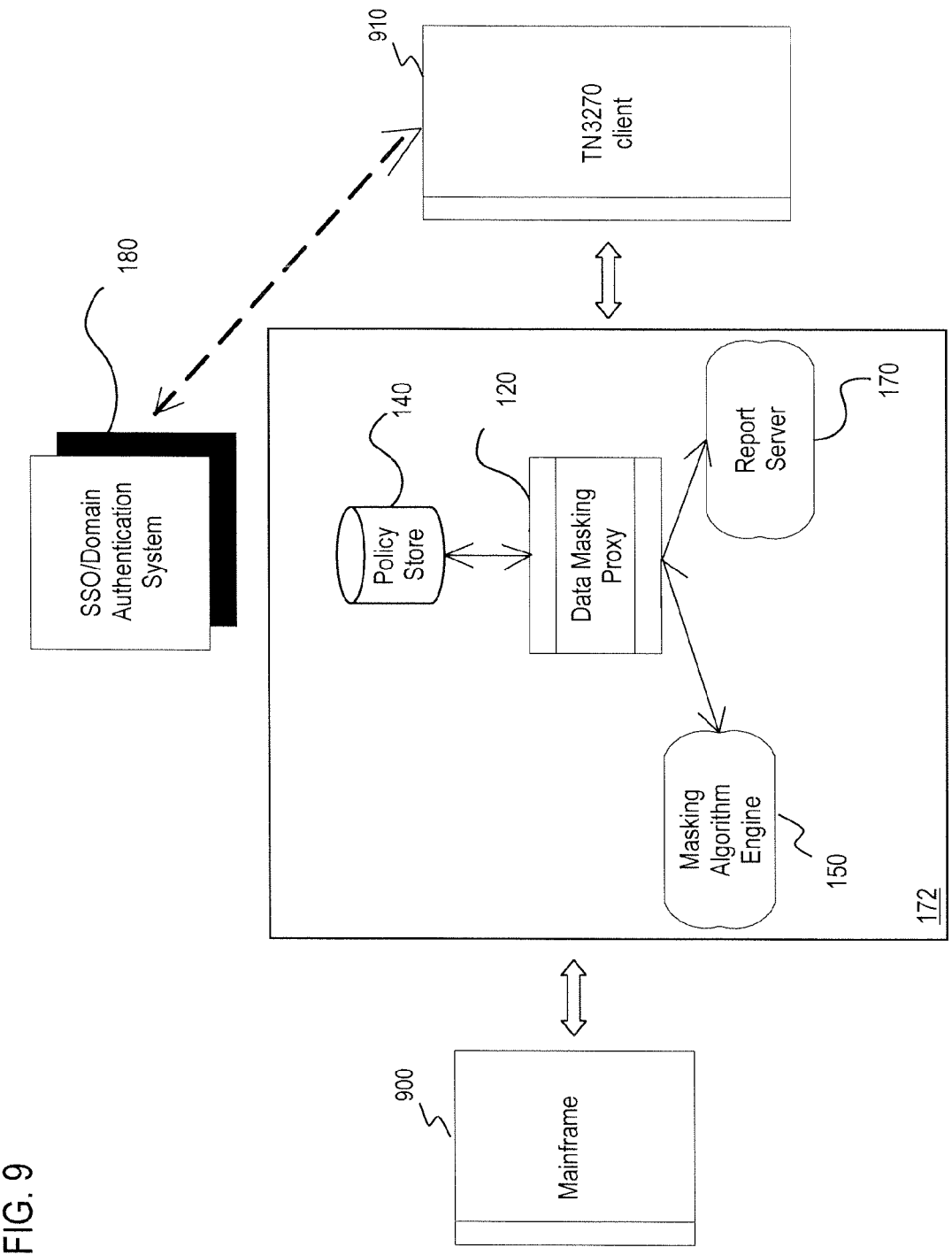
FIG. 9 is a diagram showing the system of FIG. 1 configured to provide a real-time masking client associated with a mainframe application, according to an exemplary embodiment.

FIG. 9 is a diagram showing the system of FIG. 1 configured to provide a real-time masking client associated with a mainframe application, according to an exemplary embodiment. A user accesses a mainframe application 900 via a TN3270 client 910. Because mainframes are utilized to store and process critical and sensitive data, the data requires protection to be performed efficiently. As part of the interface with mainframe system 900, a TN3270 client 910, for example, can be used to access and perform various support activities. As with the other applications (FIGS. 4-5), this client 910 communicates via the data masking portal 172 to retrieve data.

Operationally, the client 910 can interact with the mainframe application 900 similar to the other clients of FIGS. 4-5. Specifically, when the data masking proxy 120 receives a request from the TN3270 client 910, a policy is retrieved from the policy store 140. The proxy accesses the data and masks the data according to the policy. The TN3270 client 910 can also employ a tree-view control to navigate through the mainframes within the entire network, along with the associated databases. Further, the client 910 can utilize a command line interface generating data queries. The resultant data from the application 900 is masked and provided to the client 910.

Figure 10:
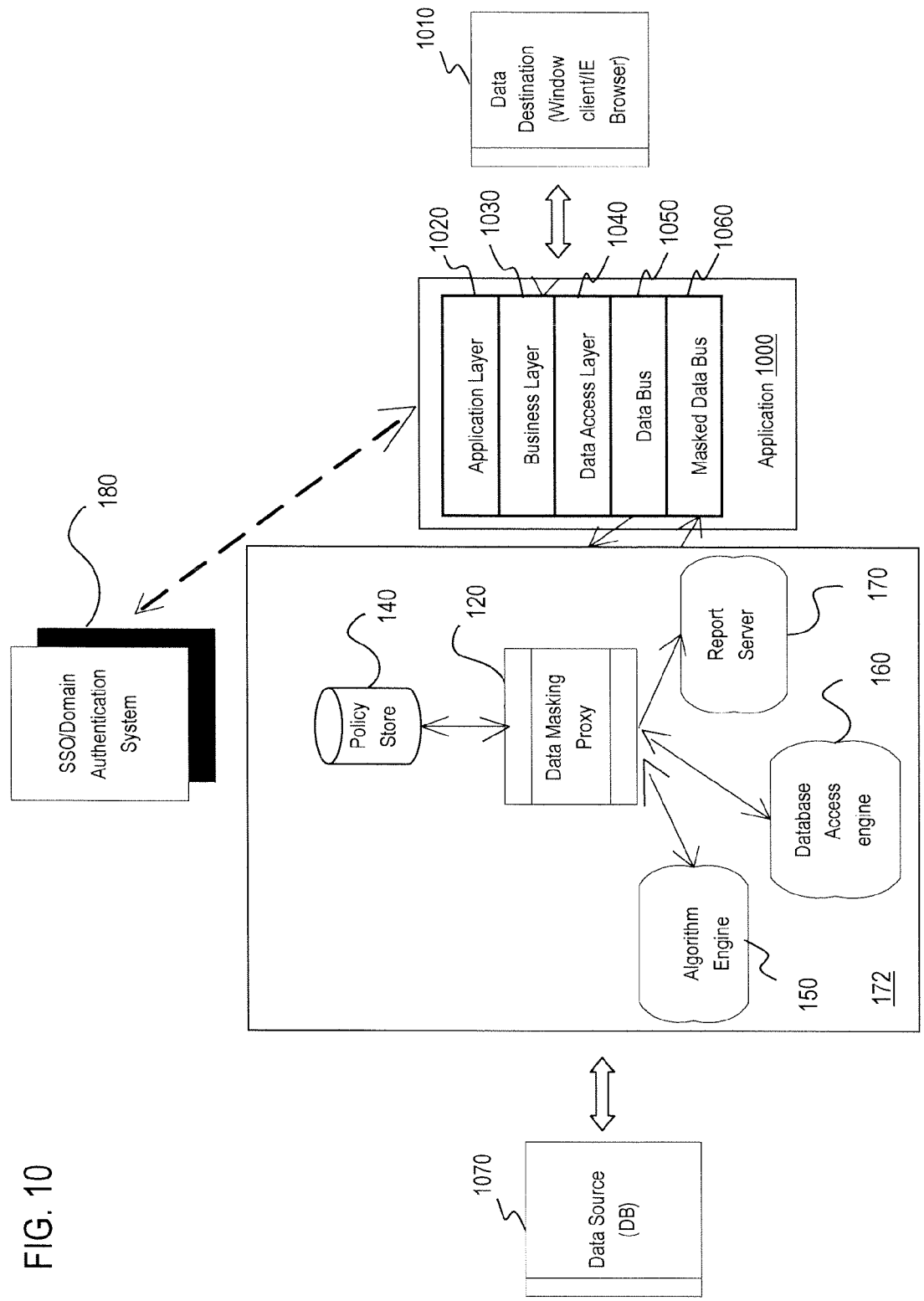
FIG. 10 is a diagram showing the system of FIG. 1 configured to provide real-time data layer masking for new or existing applications, wherein masking can occur on-the-fly, according to an exemplary embodiment.

FIG. 10 is a diagram showing the system of FIG. 1 configured to provide real-time data layer masking for new or existing applications, wherein masking can occur on-the-fly, according to an exemplary embodiment. It is recognized that conventional applications do not effectively account for data protection, and understandably so, as they are not designed to provide data protection. In general, an application 1010 may have one or more of the following layers: application layer 1020, business layer 1030, data access layer 1040, and a data bus 1050. According to one embodiment, the data bus 1050 establishes connection to the data masking proxy 120. The data masking proxy 120, in an exemplary embodiment, can provide a wrapper to all database calls, so that the data that is retrieved from the database is masked in the data masking proxy 120 and sent to the application 1000 in form of a masked data bus 1060 per the masking policy of the application 1070.

Additionally, the masked data can be sent across to the application 1000 for further businesses processing. Such application 1000 can point to the masking proxy 120 as the application 1000 configures a connection to the data source 1000. There will not be any code change in the existing application to enable masking. It can support any coding language and any data base.

The above described processes relating to data masking may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

Figure 11:
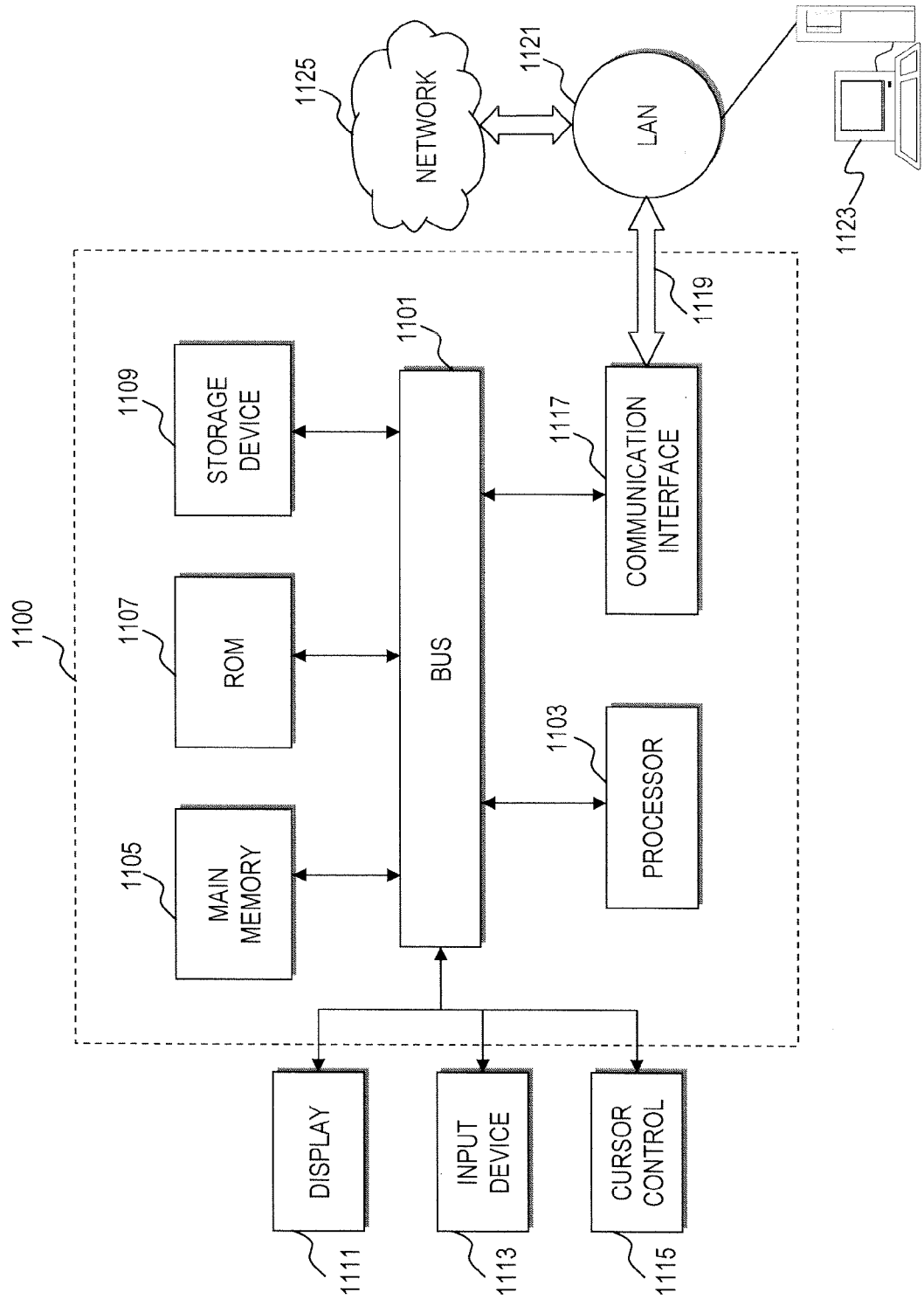
FIG. 11 is a diagram of a computer system that can be used to implement various exemplary embodiments.

FIG. 11 illustrates a computer system 1100 upon which an embodiment according to an exemplary embodiment can be implemented. For example, the processes described herein can be implemented using the computer system 1100. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to one embodiment contemplated herein, the processes described are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement certain embodiments. Thus, the exemplary embodiments are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application 11/839827 filed Aug. 16, 2007, entitled "Method and System for Masking Data"; and co-pending U.S. patent application 11/839802 filed Aug. 16, 2007, entitled "Method and System for Masking Real-time Data."

What is claimed is:

1. A method comprising:
receiving a request from an application for retrieval of data;
authenticating an end user associated with the request;
in response to the authentication, generating policy information based on input from the end user;
retrieving policy information corresponding to the application;
determining, by a processor, whether to mask the data based on the request and the authentication; and
in response to the determination, selecting a masking algorithm to apply to the data and outputting mask data using the selected masking algorithm,
wherein the determination whether to mask the data is further based on the policy information.

2. A method as recited in claim 1, further comprising:
classifying the request; and
invoking a service corresponding to the request, wherein the service specifies treatment of the request.

3. A method as recited in claim 1, further comprising:
loading a database driver for connection to a database configured to store the data.

4. A method as recited in claim 1, wherein the request is part of a transaction, the method further comprising:
logging the transaction for debugging and tracing.

5. A method according to claim 1, wherein the application includes either a Structure Query Language (SQL) application, a Lightweight Directory Access Protocol (LDAP), or a HyperText Markup Language (HTML) application.

6. A method according to claim 1, wherein the masking algorithm is dynamic.

7. An apparatus comprising:
a data masking proxy configured to receive a request from an application for retrieval of data, and to authenticate an end user associated with the request;
a masking configuration wizard configured to generate policy information in response to the authentication, based on input from the end user; and
a policy store configured to provide policy information corresponding to the application,
wherein the data masking proxy is further configured to determine, by a processor, whether to mask the data based on the request and the authentication, and in response to the determination, selecting a masking algorithm to apply to the data and outputting mask data using the selected masking algorithm, and
wherein the determination whether to mask the data is further based on the policy information.

8. An apparatus as recited in claim 7, wherein the data masking proxy is further configured to further classify the request, and to invoke a service corresponding to the request, the service specifying treatment of the request.

9. An apparatus as recited in claim 7, further comprising:
a database access engine configured to store a plurality of database drivers, wherein the data masking proxy is further configured to load one of the database drivers for connection to a database configured to store the data.

10. An apparatus as recited in claim 7, wherein the request is part of a transaction, the apparatus further comprising:
a report server configured to log the transaction for debugging and tracing.

11. An apparatus according to claim 7, wherein the application includes either a Structure Query Language (SQL) application, a Lightweight Directory Access Protocol (LDAP), or a HyperText Markup Language (HTML) application.

12. An apparatus according to claim 7, wherein the masking algorithm is dynamic.

13. A method comprising:
transmitting a request for data to a data masking portal, wherein the portal is configured to authenticate an end user originating the request, and to output, by a processor, mask data using a masking algorithm that is selected based on the request and the authentication; and
receiving the mask data from the portal,
wherein the portal is further configured to obtain policy information in response to a selection by the end user, the selection is made after authentication of the end user, and the determination whether to mask the data is further based on the policy information.

14. A method as recited in claim 13, wherein the portal is further configured to classify the request, and to invoke a service corresponding to the request, wherein the service specifies treatment of the request.

15. A method as recited in claim 13, wherein the portal is further configured to activities associated with the request for debugging and tracing.

16. A method according to claim 13, further comprising:

executing either a Structure Query Language (SQL) application, a Lightweight Directory Access Protocol (LDAP), or a HyperText Markup Language (HTML) application to generate the request.

17. An apparatus comprising:

an application configured to transmit a request for data to a data masking portal, wherein the portal is configured to authenticate an end user originating the request, and to output, by a processor, mask data using a masking algorithm that is selected based on the request and the authentication, wherein the application is further configured to receive the mask data from the portal, and wherein the portal is further configured to obtain policy information in response to a selection by the end user, the selection is made after authentication of the end user, and the determination whether to mask the data is further based on the policy information.

18. An apparatus as recited in claim 17, wherein the portal is further configured to classify the request, and to invoke a service corresponding to the request, wherein the service specifies treatment of the request.

19. An apparatus as recited in claim 17, wherein the portal is further configured to activities associated with the request for debugging and tracing.

20. An apparatus according to claim 17, further comprising:

executing either a Structure Query Language (SQL) application, a Lightweight Directory Access Protocol (LDAP), or a HyperText Markup Language (HTML) application to generate the request.

* * * * *